3,036,656
NOISE SUPPRESSOR FOR PRESSURE REDUCING VALVES

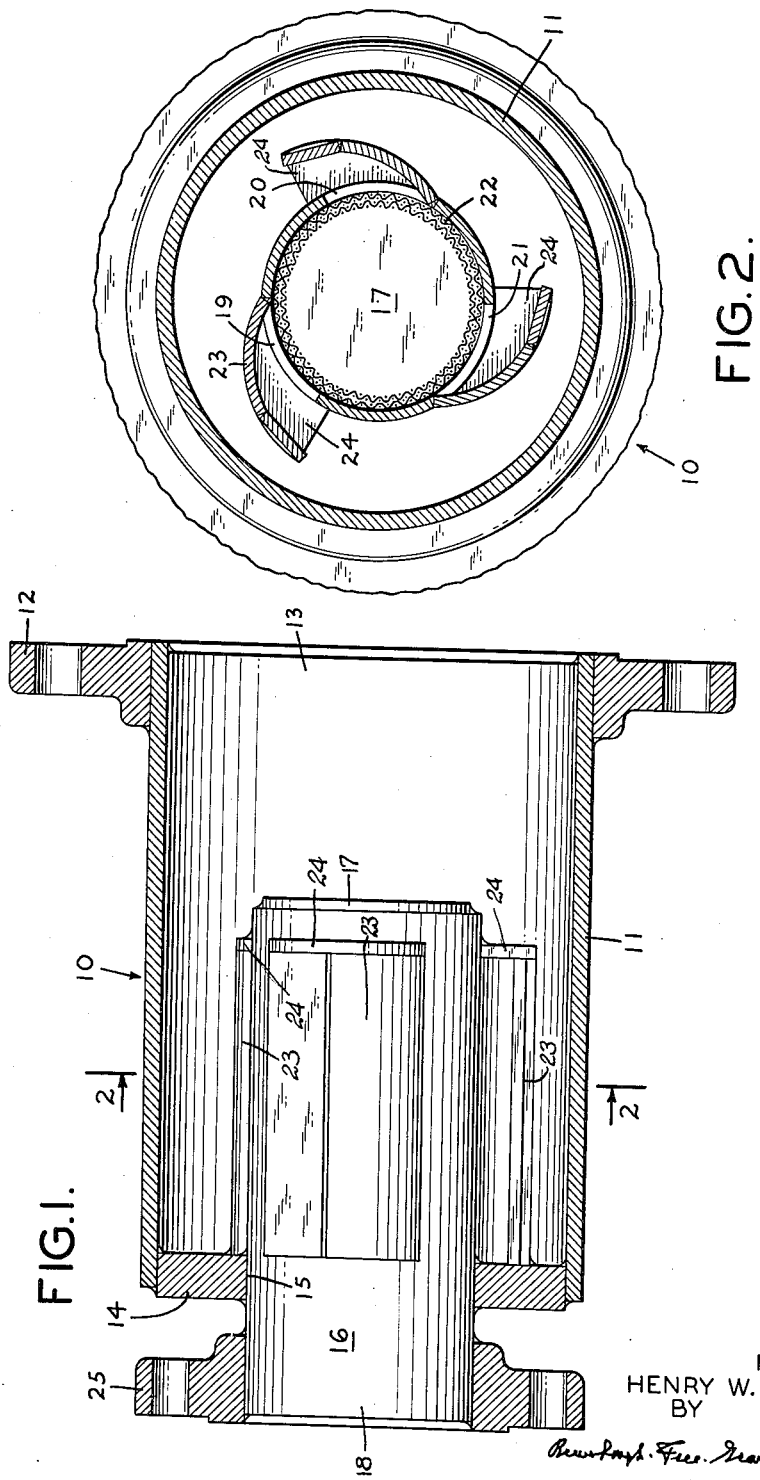

Henry W. Angelery, 19 Gwynne Court, Northvale, N.J.
Filed Aug. 24, 1959, Ser. No. 835,502
7 Claims. (Cl. 181—58)

The present invention relates to the suppression or elimination of the noise produced by the expansion of fluids under pressure and more particularly to the reduction of noise created as the result of expansion of fluids through pressure reducing valves and the like equipment.

A common problem found in the reduction of pressure of compressible fluids through throttling or pressure reduction valves is the resulting increase of velocity in the discharge pipe particularly if said pipe has the same diameter as the valve discharge. This increase in velocity is proportional to the decrease in density caused by the expansion of the fluid. Concomitant with the increased velocity, cavitation and eddy currents are set up causing vibrating columns which result in disagreeable noises. If the pipe has sharp turns or joints in the path of the fluid before complete expansion is accomplished, additional eddy currents will be produced adding to the volume of noise. The force which causes the noise is the release of the internal work energy into a velocity head which continues until dissipated through work or friction. For example, steam entering a 5″ pressure reducing valve at 200 p.s.i.g. pressure with a velocity of 10,000 f.p.m. and is reduced to 30 p.s.i.g. through the pressure reducing valve will then discharge from the 5″ outlet of the valve at an approximate velocity of 47,300 f.p.m. In order to accommodate the same quantity of steam flowing to the valve in the 5″ inlet pipe at 200 p.s.i.g. pressure, a 10″ diameter pipe would be required at 30 p.s.i.g. to have approximately the same velocity as that in the 5″ pipe, i.e., approximately 10,000 f.p.m. Permitting the steam to flow from the 5″ valve outlet at 47,300 f.p.m. velocity into the 10″ pipe will cause considerable and very disagreeable noises to be created.

It is the primary purpose of this invention to control the flow of fluid in a pipe in such a manner as to suppress the noise which necessarily follows the reduction in pressure of compressible fluids.

It is a further object of this invention to reduce the noise by causing the fluid to work upon itself and so dissipate the dynamic force rapidly and without allowing eddy currents and cavitations to take place.

A further object is to provide a simple and durable device to achieve the suppression.

Other objects will be apparent from the following description of a typical form of the invention and reference to the accompanying drawings, in which:

FIGURE 1 is a view partly in longitudinal section and partly in side elevation of a typical noise suppressor according to the invention, and FIGURE 2 is a sectional view taken on line 2—2 of FIGURE 1.

A typical noise suppressor 10 embodying the invention includes an outer tubular member 11 of any desired diameter having a flange 12 at one end for connecting it to a pipe (not shown). The outer tubular member 11 is provided with an outlet 13 for discharging the expanded fluids into the pipe to which the member is connected. The opposite end of the member 11 has a wall 14 with a hole 15 therein in which an inner tubular member 16 is mounted.

The inner tubular member 16 has a closure plug 17 sealing its right hand end as viewed in FIG. 1 and has an inlet 18 at its opposite end for receiving fluid from a pressure reducing valve or the like (not shown). That part of the tubular member 16 inside the tubular member 11 is provided with a plurality of slots 19, 20 and 21 extending the length thereof and equally spaced about the periphery of the inner tubular member and of a width sufficient to obtain maximum area of opening between the inner tubular member and the expansion chamber. While three slots are shown, more or fewer slots may be provided as required.

Layers of fine wire screening 22, such as stainless steel screening, are placed concentrically about the inner circumference of the inner tubular member 16 so that the fluid flowing through the slots 19, 20 and 21 is diffused by the screening 22. The fluid passing through the slots is directed tangentially of the member 11 by means of baffles 23 formed of steel plates extending the length of the slots and outwardly across the slots and to a point midway between the inner surface of the outer tubular member 11 and the outer surface of the inner tubular member 16. End walls 24 extend between the ends of the slots.

A pipe coupling flange 25 is fixed to the upstream end of the member 16 to enable it to be secured to the downstream end of the reducing valve or a pipe connected to it. High velocity fluid from the valve enters the member 16 and flows through the diffusing screen 22 and the slots 19 to 21.

As the diffused fluid flows through the slots 19, 20 and 21, the baffles 23 direct the flow tangentially or substantially tangentially thereby causing the fluid to rotate at high velocity adjacent to the inner surface of the outer tubular member 11 and rapidly dissipating energy because of high friction. As the fluid rotates and expands and its energy is dissipated, it flows with such decreased velocity and violence through the outlet 13 into a larger diameter pipe that cavitation or eddy currents are eliminated together with the noise usually resulting therefrom.

While the noise suppressor described above is a preferred form of the invention, it is illustrative and should not be considered as limiting the invention as defined in the following claims.

I claim:

1. A noise suppressor, comprising an outer tubular member having one open end devoid of restrictions, means at said open end of said member for connecting it with a pipe, an end closure in the opposite end of said tubular member having a smaller opening therein, a smaller diameter tubular member mounted in said opening and extending lengthwise of said outer tubular member in spaced relation thereto to form an annular space therebetween, said smaller tubular member having one end open for receiving high velocity fluid and its opposite end closed and having at least one slot in its periphery allowing said fluid to flow from said inner tubular member into said annular space and means on said smaller member adjacent to said slot for directing said fluid from said slot substantially tangentially against the inner surface of the outer tubular member and for rotational flow around said annular space and out through the open end of said tubular member to dissipate the energy of said fluid and prevent cavitation and formation of eddy currents in said pipe.

2. The noise suppressor set forth in claim 1, comprising a plurality of slots extending lengthwise of the inner tubular member in angularly spaced relation around the periphery of said inner tubular member.

3. The noise suppressor set forth in claim 1, comprising concentric layers of screening within said inner member and spanning said slot to diffuse fluid flowing through said slot.

4. The noise suppressor set forth in claim 1, in which said means for directing the flow of fluid tangentially comprises a baffle extending from one edge of said slot across the width of said slot and having a free edge terminating about midway between said outer and inner members.

5. The noise suppressor set forth in claim 1, in which said means for directing the flow of fluid tangentially comprises a baffle extending from one edge of said slot across the width of said slot and having a free edge terminating about midway between said outer and inner members and end walls at opposite ends of each slot extending between said inner member and the ends of each of said baffles.

6. A noise suppressor and energy dissipator comprising a first tubular member having one open end, means at said open end for connecting said tubular member with a source of high velocity fluid, a wall closing the opposite end of said member, a plurality of substantially radially directed slots in the said member between its ends, a second tubular member concentric and communicating with said first member through the slots therein, said second member being of larger internal diameter than the external diameter of the first member and having an open end devoid of restrictions adjacent to the closed end of said first member, means at said open end of second member for connecting it to a pipe, a wall closing the opposite end of said second tubular member and supporting said first tubular member substantially coaxially of said second tubular member, and baffles on said first member adjacent to said slots for directing fluid issuing from said slot substantially tangentially between said members for rotational flow between them and through said open end to dissipate energy and prevent cavitation and formation of eddy currents in said pipe.

7. A noise suppressor and energy dissipator comprising a first tubular member having one open end and an opposite closed end and a plurality of slots between its ends, said first member having concentric layers of screening therein spanning said slots to diffuse fluids flowing through said slots, a second tubular member concentric and communicating with said first member through the slots therein, said second member being of larger internal diameter than the external diameter of the first member and having an open end devoid of restrictions adjacent to the closed end of said first member, means at said open end of said second member for connecting it to a pipe, a wall closing the opposite end of said second tubular member and supporting said first tubular member substantially coaxially of said second tubular member, and baffles on said first member adjacent to said slots for directing fluid issuing from said slot substantially tangentially between said members for rotational flow between them and through said open end of said second member to dissipate energy and prevent cavitation and formation of eddy currents in the said pipe.

References Cited in the file of this patent

UNITED STATES PATENTS

| | | |
|---|---|---|
| 821,828 | Phelps | May 29, 1906 |
| 822,127 | Hufnagel | May 29, 1906 |
| 992,839 | Wolle et al. | May 23, 1911 |
| 1,949,074 | Gunn | Feb. 27, 1934 |
| 2,025,271 | Compo | Dec. 24, 1935 |
| 2,329,101 | Chipley | Sept. 7, 1943 |

FOREIGN PATENTS

| | | |
|---|---|---|
| 771,759 | Great Britain | Apr. 3, 1957 |